(12) United States Patent
Busani et al.

(10) Patent No.: US 11,421,796 B2
(45) Date of Patent: Aug. 23, 2022

(54) LOAD SENSING TYPE HYDRAULIC SYSTEM WITH HYDRAULIC ADJUSTMENT DEVICE

(71) Applicant: WALVOIL S.P.A., Reggio Emilia (IT)

(72) Inventors: Ulderico Busani, Reggio Emilia (IT); Davide Mesturini, Ozzano dell'Emilia (IT)

(73) Assignee: WALVOIL S.P.A., Reggio Emilia (IT)

(*) Notice: Subject to any disclaimer, the term of this patent is extended or adjusted under 35 U.S.C. 154(b) by 130 days.

(21) Appl. No.: 16/655,604

(22) Filed: Oct. 17, 2019

(65) Prior Publication Data

US 2020/0124194 A1  Apr. 23, 2020

(30) Foreign Application Priority Data

Oct. 18, 2018 (IT) .......................... 102018000009591

(51) Int. Cl.
*F16K 17/19* (2006.01)
*F15B 13/02* (2006.01)
*F16K 11/10* (2006.01)

(52) U.S. Cl.
CPC ............ *F16K 17/19* (2013.01); *F15B 13/024* (2013.01); *F16K 11/105* (2013.01); *F15B 2211/20553* (2013.01); *F15B 2211/51* (2013.01); *F15B 2211/65* (2013.01)

(58) Field of Classification Search
CPC ...... F16K 17/19; F16K 11/105; F15B 13/024; F15B 2211/51; F15B 2211/65; F15B 2211/20553; F15B 2211/6058; F15B 2211/652; F15B 11/168; F04B 49/22; F04B 49/065; F04B 49/08
See application file for complete search history.

(56) References Cited

U.S. PATENT DOCUMENTS

| | | | | |
|---|---|---|---|---|
| 3,859,790 A | * | 1/1975 | Bacquie | F16H 61/42 60/422 |
| 3,987,623 A | | 10/1976 | Bianchetta | |
| 4,938,023 A | * | 7/1990 | Yoshino | E02F 9/123 414/687 |
| 5,630,317 A | | 5/1997 | Takamura et al. | |

(Continued)

FOREIGN PATENT DOCUMENTS

EP  1164297 A1  12/2001

OTHER PUBLICATIONS

European Search Report dated May 15, 2020 from counterpart EP App No. 19204130.9.

*Primary Examiner* — William M McCalister
(74) *Attorney, Agent, or Firm* — Shuttleworth & Ingersoll, PLC; Timothy J. Klima (57) ABSTRACT

A hydraulic system comprises a valve distributor comprising one or more sections connectable to respective uses, a supply apparatus comprising a pump and a supply channel, a discharge channel connected to a low-pressure tank, a use signal channel coming from the section of the valve distributor and further comprises a hydraulic regulating device connected via said channels which includes a 2-position 3-way proportional valve configured so as to provide operative fluid at a conditioned pressure, different with respect to the pressure that is characteristic of the operative condition of use, to the supply apparatus and at least one proportional pressure reducing valve.

15 Claims, 9 Drawing Sheets

(56) References Cited

U.S. PATENT DOCUMENTS

| | | | |
|---|---|---|---|
| 2007/0125078 A1* | 6/2007 | Tanaka | F15B 11/17 60/421 |
| 2013/0146162 A1 | 6/2013 | Coolidge | |
| 2013/0167518 A1* | 7/2013 | Weickert | E02F 9/2228 60/327 |
| 2014/0064998 A1* | 3/2014 | Bartov | B64D 39/02 418/27 |
| 2015/0020516 A1* | 1/2015 | Matsushima | F16K 17/06 60/459 |
| 2017/0058486 A1* | 3/2017 | Oka | E02F 9/128 |
| 2017/0130742 A1* | 5/2017 | Goto | E02F 9/2267 |
| 2017/0253468 A1* | 9/2017 | Gebele | F15B 11/044 |
| 2018/0031006 A1* | 2/2018 | Terao | F15B 11/16 |

* cited by examiner

LOAD SENSING TYPE HYDRAULIC SYSTEM WITH HYDRAULIC ADJUSTMENT DEVICE

This application claims priority to Italian Patent Application 102018000009591 filed Oct. 18, 2018, the entirety of which is incorporated by reference herein.

FIELD OF APPLICATION OF THE INVENTION

The present invention belongs to the field of hydraulic systems comprising a hydraulic regulating device.

SCENARIO OF THE INVENTION

It is known, also for reasons of costs and dimensions, the use of a pump to operate several utilities, especially for moving applications, in order to be able to manage and diversify the flow rates to the single utilities regardless of the loads and of the behaviour of the other utilities. e.g. as in the compensated load sensing systems for multiple utilities. Furthermore, with the Load Sensing systems it is also possible to calibrate the maximum flow rate that can be sent to each utility.

To achieve this, the Load Sensing distributors take the pressure after the distributing slider and send it to a flow rate regulator that imposes a pressure upstream the slider equal to the Load Sensing LS pressure plus a fixed standby. In this way a fixed pressure jump is imposed via the dosing niches of the slider and consequently a fixed flow rate is also imposed independent of the LS pressure but only as a function of the passage area opened by the dosing niches of the slider.

This flow rate regulator is generally positioned on a variable displacement pump of the Load Sensing type which sends only the flow rate necessary to generate the pressure jump imposed by the flow rate regulator itself. Or, in the case of pumps with constant or variable displacement but not LS, a compensator is inserted in derivation to the delivery line of the distributor. The latter sends to the utility only the flow rate that generates the pressure jump imposed by the compensator itself while it drains the excess flow rate directly to the discharge.

In the case of simultaneous actuations of several utilities, the distributor is equipped with a system adapted to send the highest pressure to the compensator among those actuated. To maintain the Load Sensing characteristic even in the lower pressure utilities there is a series of local compensators, one for each element.

An example of a traditional circuit that uses a pressure compensator is represented by U.S. Pat. No. 3,987,623.

US 2013/0146162 describes a further example of a circuit in which the LS signal is compensated with the pressure P provided by the pump, allows it to be provided with a signal at a pressure equal to or greater than that of LS Load Sensing.

However, this solution does not allow the pump operation to be optimized if a lower flow rate is required.

On the other hand, it would be desirable to reduce consumption and dissipations connected with the standby of the pump that are typical of the Load Sensing systems, without affecting the control and regulation characteristics.

It would also be suitable to provide additional tools and adjustment variables suitable to optimize the system and overcome the constructive rigidity due to the pre-established settings and calibrations.

EXPOSURE AND ADVANTAGES OF THE INVENTION

The technical problem underlying the present invention is that of providing a hydraulic system which allows improving the known solutions and can at least partially overcome one or more of the identifiable disadvantages in relation to the prior art.

A further object of the present invention is that of providing a hydraulic system which allows greater regulation flexibility and can be better adapted to the different conditions of use.

It is also an object of the present invention to provide a hydraulic system in which consumption and dissipations connected with the standby of the pump can be optimized.

This problem is solved and these objects are achieved by a hydraulic system made in accordance with the present disclosure.

It will be appreciated that the hydraulic system of the present invention comprises a hydraulic regulating device associated with a valve distributor. This device is advantageously constituted by a 2-position 3-way proportional valve controlled by the pressure signal provided by at least one proportional pressure reducing valve, or, in some embodiments, by the equivalent pressure signal of one or more preloaded springs or a signal pressure coming from the discharge.

In this way the pressure jump P-LS, defined by the difference between the high pressure provided by the supply apparatus and the pressure of the Load Sensing signal of the hydraulic system can be advantageously managed as a function of the uses or conditions in which the system hydraulic works.

Advantageously, the management of the pressure jump P-LS allows sending to the pump of the supply apparatus a conditioned pressure which can be either higher or lower than the load sensing pressure LS value.

This is in fact possible since the pressure LS is copied into the hydraulic regulating device of the present invention, which allows it to be compared with the pressure P provided by the supply apparatus and to provide a different, conditioned signal, as a function of the required operating modes.

According to another aspect of the invention, this pressure jump can be managed electrically by acting on at least one proportional pressure reducing valve, sending to the supply apparatus a different pressure, which is different with respect to the actual one present on the uses of the distributor.

In some embodiments, the supply apparatus comprises a variable displacement pump of the Load Sensing type and the aforesaid different pressure is sent to the pump flow rate regulator, in such a way as to carry out the flow rate regulation as a function of the signal provided by the conditioned pressure.

According to preferred embodiments, the regulation of the proportional pressure reducing valves can be managed directly by the operator.

In some embodiments, the hydraulic system is interfaced to an external control unit which manages, possibly automatically, the proportional pressure reducing valves as a function of a series of inputs received from sensors placed on the machine and/or on the distributor.

For example the regulation can take place:
according to a system in which the operator performs repetitive cycles, the present invention can vary the standby by maximizing the overall number of cycles or minimizing consumption;

the same operator could set low standbys and therefore lower flow rates in the case of precision operations and conversely high standbys and high speeds for approaching operations;

in general, as a function of the type of machine and use, various ways of varying the standby value as a function of various inputs can be provided in order to set a variable torque limitation that is a function of the revolutions of the engine by indirectly controlling parameters such as maximum power, the required torque, etc.;

the sliders are designed to obtain the maximum required flow rate, at the standby value set at the end of stroke of the slider, so as to exploit the stroke to the maximum and therefore improve the sensitivity. If operating at low number of engine revolutions under a pump saturation condition, a dead band may be provided in the stroke of the slider: the slider manages the flow rate up to a certain stroke while the last section is not usable. By reducing the variable standby, instead, it can be set so as to always exploit the entire stroke and therefore improve the sensitivity in precision movements;

in the case of a fixed or non-LS variable displacement pump with an inlet compensator in the distributor, the flow rate is sent to the distributor even in the absence of actuations of the utilities. The incoming flow rate is disposed of via the compensator directly to the discharge at the imposed pressure standby. Now, as a function of a system capable of detecting whether the operator has activated a slider (and therefore a utility) or not, the present invention can minimize the standby so as to minimize energy consumption.

Further preferred features of the invention are defined in the dependent claims.

BRIEF DESCRIPTION OF THE DRAWINGS

This and other features will be more apparent from the following description of some of the embodiments, illustrated purely by way of non-limiting example in the accompanying drawings.

DETAILED DESCRIPTION OF PREFERRED EMBODIMENTS OF THE INVENTION

Figure 1:
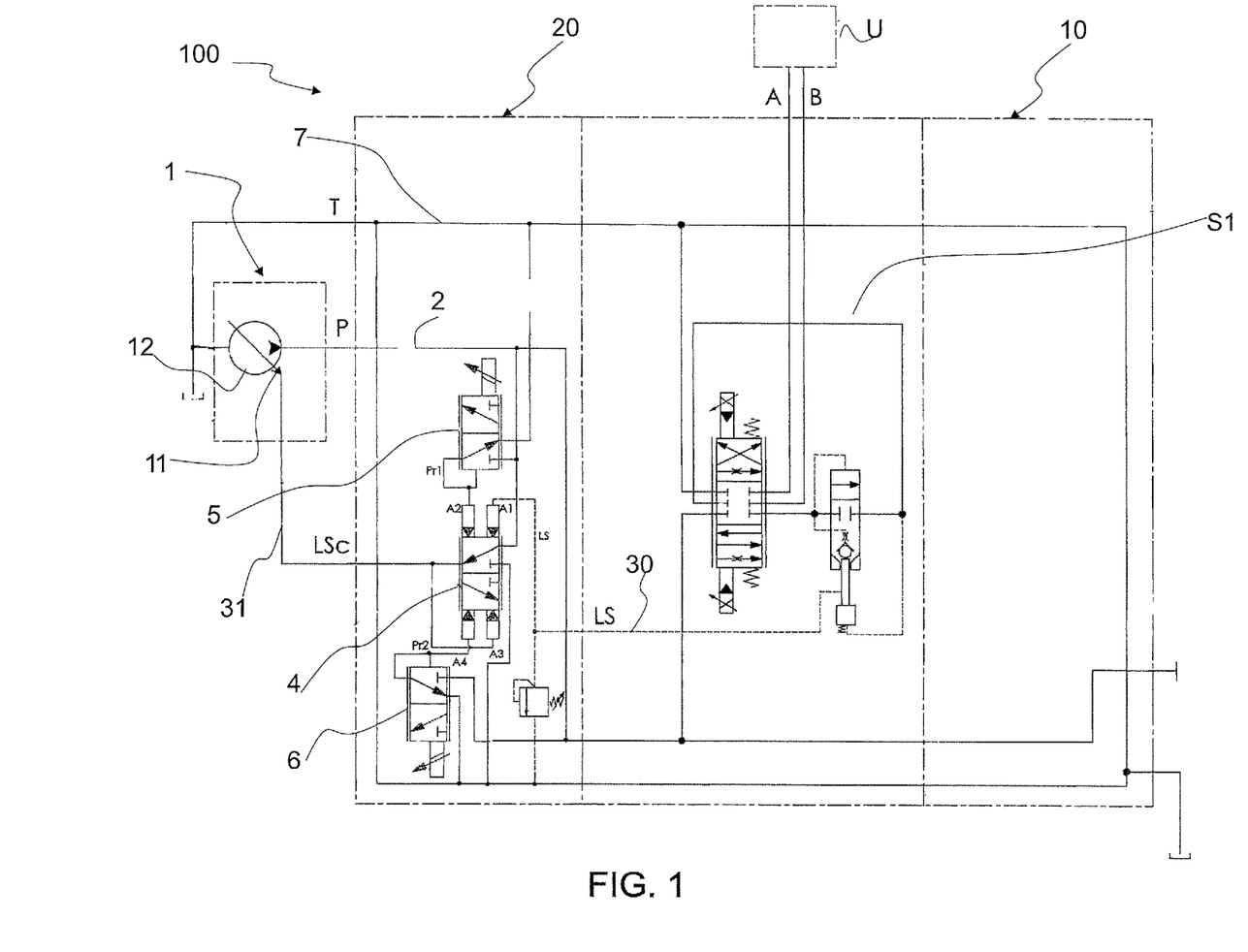
FIG. 1: shows a circuit diagram of a hydraulic system with a Load Sensing valve distributor according to the present invention.

With reference initially to FIG. 1, a hydraulic system according to the present invention is generally indicated with the reference number 100.

The hydraulic system 100 is intended for the actuation of one or more uses such as, for example, the actuation of hydraulic actuators in an excavator. It is however evident that the system of the present invention can also be used with uses of different types.

The connection to the uses takes place by means of a valve distributor 10 which comprises one or more sections S1, ... Sn connectable to the uses U1, ..., Un. Preferably, each section comprises a slider intended to provide the oil flow rate necessary for actuating the respective use.

The flow rate of fluid is provided to the distributor 10 by a supply apparatus 1 which, in a first embodiment, comprises a variable displacement pump of the Load Sensing type.

It will in any case be appreciated that, in general, the supply apparatus 1 can comprise a pump 12 also of other types, and a supply channel 2, connected to the pump 1, through which the fluid is provided at high pressure P to the sections of the valve distributor 10 according to modalities which will be described in greater detail below. It will however be appreciated that, in some embodiments, in which the pump 12 is of the variable displacement type, there is a flow rate regulator 11, for example formed by a pressure compensator.

Figure 7:
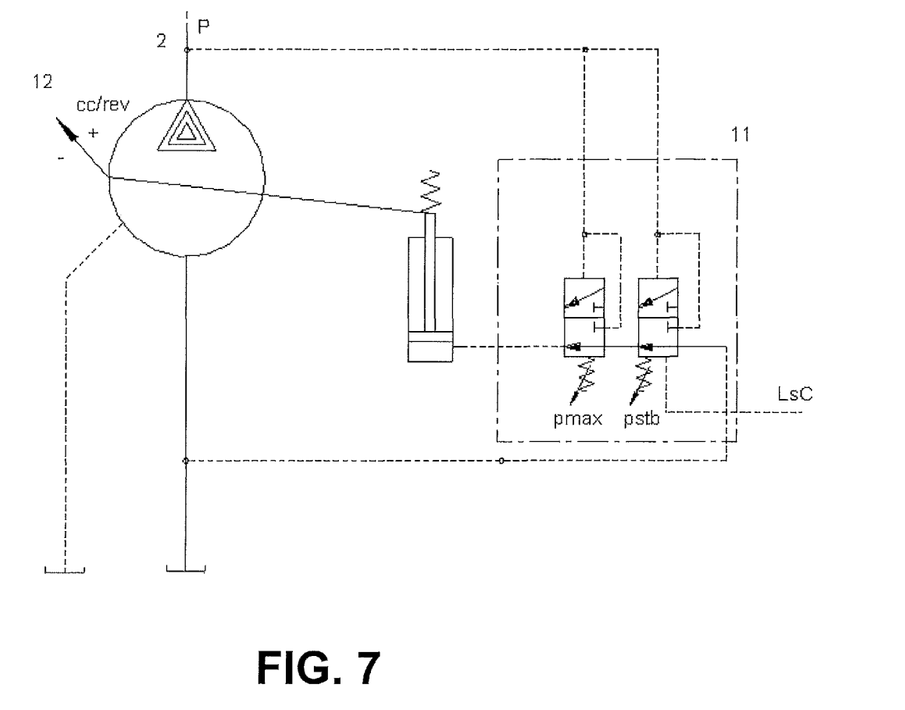
FIG. 7: shows a detail of a diagram relating the connection to a variable displacement pump of the hydraulic regulating device of the present invention.

A schematic diagram of the variable displacement type pump 12 used in preferred embodiments of the present invention, in particular in the embodiments of FIGS. 1-5 is shown in FIG. 7.

Furthermore, a design standby $p_{stb}$ is associated with the pump 12, defined by features of the pump itself and characteristic of the difference between the delivery pressure P and the pressure on the use LS that would be obtained by providing the pressure LS directly to the flow rate regulator 11 of the pump 12. Accordingly, the design standby $p_{stb}$ may be represented by a respective pressure value.

The system is also connected to a low-pressure tank T, and more generally to the discharges of the uses, via a discharge channel 7.

The hydraulic system 100 according to the present invention further comprises a hydraulic regulating device 20 associated with the valve distributor 10, whose functions will be better shown below.

The hydraulic regulating device 20 can be integrated inside the distributor or be in the form of a separate assembly with respect to the valve distributor 10, which can be connected to it through the aforesaid channels. In the latter case the hydraulic regulating device 20 can advantageously become an accessory which can be combined with a traditional distributor, without requiring substantial modifications to the latter.

With reference now again to FIG. 1, it will also be appreciated that in the system of the present invention, a channel of the Load Sensing signal 30 coming from the sections of the valve distributor 10 can also be identified.

The channel 30 is preferably configured so as to receive from the sliders of the valve distributor a Load Sensing signal, to which a respective Load Sensing LS pressure corresponds. More generally, the channel 30 receives from the slider of a respective section a signal that is characteristic of the corresponding use, representative of the pressure that is characteristic of the specific operative condition of use.

Figure 2:
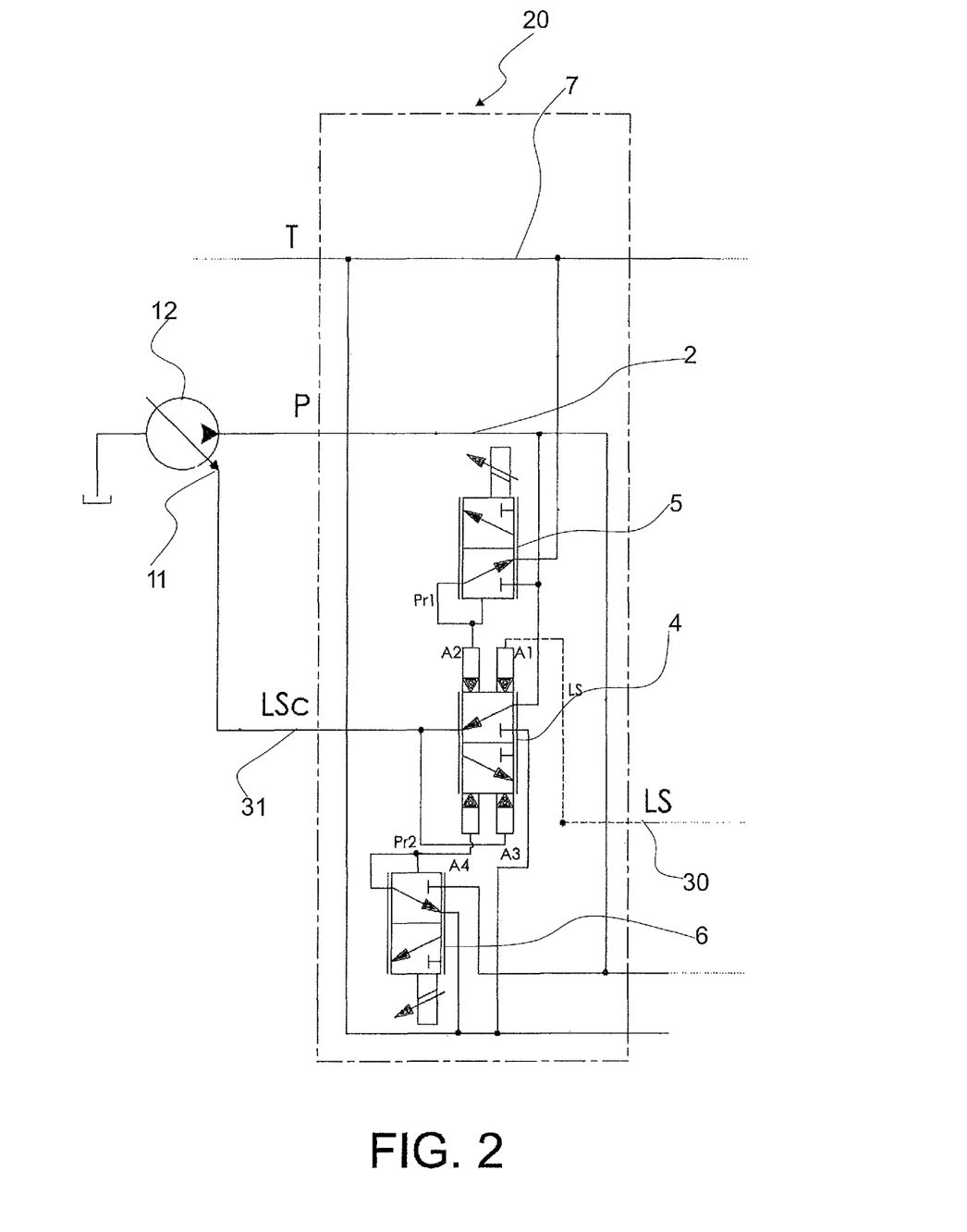
FIG. 2: shows a diagram of a hydraulic regulating device, detail of the hydraulic system of FIG. 1.

With reference now in particular to FIG. 2, the hydraulic regulating device 20 in a first embodiment thereof will be shown in detail.

To this regard, according to an aspect of the invention, the hydraulic regulating device 20 comprises a 2-position 3-way proportional valve 4 supplied by the supply channel 2 and connected, via the discharge channel, to the tank T.

As will be seen in greater detail below, the proportional valve 4 is configured so as to provide the operative fluid to the flow rate regulator 11 of the pump 12, via a conditioned pressure $LS_C$ supply channel 31, at a conditioned pressure $LS_C$, possibly different from the Load Sensing LS pressure, that is the channel 30 pressure.

The value of the conditioned pressure $LS_C$ is regulated by means of at least one proportional pressure reducing valve. In the present embodiment a first pressure reducing valve 5 and a second reducing valve 6 are present.

Each of these valves is adapted to provide a reduced pressure pr1, pr2 to the proportional valve 4.

In greater detail, according to a preferred embodiment, the proportional valve 4 has four thrust areas A1, A2, A3, A4, the first two being arranged at a first end of the proportional valve 4 and the second two being arranged at a second end, opposite to the first one.

In the embodiment of FIG. 2, the first end of the proportional valve 4 is subjected:
 to the pressure of the signal LS coming from the duct 30 of the valve distributor for the thrust area A1, which is therefore copied to proportional valve 4;
 at a reduced pressure pr1 provided by the first pressure reducing valve for the thrust area A2.

The second end of the proportional valve 4 is instead subjected:
 to the conditioned $LS_C$ pressure LS for the thrust area A3;
 to the reduced pressure pr2 of the second proportional reducing valve 6 for the thrust area A4.

To illustrate the operation of the system according to the present invention and, in particular, of the hydraulic regulating device, a situation of balance of the valve 4 will be initially considered with reference to the system represented in FIG. 2.

Under this condition the following equation is verified:

$$LS \times A1 + (pr1 + p_T) \times A2 = LS_C \times A3 + (pr2 + p_T) \times A4$$

wherein LS is the Load Sensing signal pressure, $LS_C$ is the conditioned pressure, A1, A2, A3 and A4 the thrust areas, $p_T$ the pressure at the tank and pr1, pr2 the reduced pressures provided by the reducing valves 5, 6.

We suppose initially, a situation in which no slider is actuated and the reducing valves are not energized. In this situation the regulator present on the pump moves to zero displacement. In fact:

$$LS \times A1 = LS_C \times A3$$

For explanatory simplicity's sake, A1=A3 and A2=A4 are taken into account, i.e. $LS_C$ is equal to LS which, in turn, in the situation of no actuated slider, is at the pressure $p_T$ of the tank T. The pressure $LS_C$ acts on the flow rate regulator 11 of the pump LS 12 which therefore, according to what has been said, imposes a pressure P in the supply duct 2 equal to $LS_C + p_{stb}$, therefore equal to $LS + p_{stb}$, therefore equal to $p_T + p_{stb}$. Where $p_T$ indicates the pressure at the tank and which can be, again for simplicity's sake of exposition, assumed to be zero. It follows that the flow rate sent by the pump, in the case of no sliders being actuated, is the minimum one that allows the pump plate to be kept at zero displacement through the flow rate regulator 11.

In the case of slow and particularly precise movements, it is possible not to supply the reducing valves 5 or 6 even with actuated sliders. In the case of non-supplied reducing valves, the balance still applies:

$$LS \times A1 = LS_C \times A1$$

Therefore in this situation a pressure P equal to $LS_C + p_{stb}$ is imposed in the supply channel 2, but being $LS_C = LS$ it means that a pressure equal to $LS + p_{stb}$ is imposed.

But LS is the pressure downstream of the slider so the compensator imposes, through the dosing niches of the sliders, a constant actual standby equal to the design standby $p_{stb}$, i.e. the regulation value of the regulator 11 of the pump 12.

Supposing instead to supply the reducing valves so that the reduced pressures are pr1 and pr2. Resuming the general balance:

$$LS \times A1 + (pr1 + p_T) \times A2 = LS_C \times A1 + (pr2 + p_T) \times A2$$

We always hypothesize zero pressure $p_T$ in the tank T and that the ratio A2/A1=α it follows, with simple mathematical steps, that:

$$LS_C - LS = (pr1 - pr2) \times \alpha$$

If we hypothesize, for simplicity's sake, that A1 is equal to A2 and therefore α=1, it derives therefrom:

$$LS_C = LS + pr1 - pr2$$

The pressure $LS_C$ acts on the regulator 11 of the pump 12 so the pressure P is equivalent to $$P = LS_C + p_{stb}$$

$$P = LS + pr1 - pr2 + p_{stb}$$

$$P - LS = pr1 - pr2 + p_{stb}$$

Therefore, it will be possible to obtain an actual standby, defined therefore as the difference between the pressure of the signal LS and the pressure provided by the supply apparatus 1 different with respect to the design standby pressure $p_{stb}$, which, as previously indicated, is characteristic of the pump used.

In other words, in the system according to the present invention, as a function of the number of external parameters of the hydraulic system, the shape of the curve of the flow rate sent to the uses of the distributing valve 10 can be adjusted by varying, in addition to the stroke of the sliders and therefore the passage area, a delta of pressure between that of the channel 2 and that of the channel 30, thus obtaining greater flexibility for the system.

Figure 5:
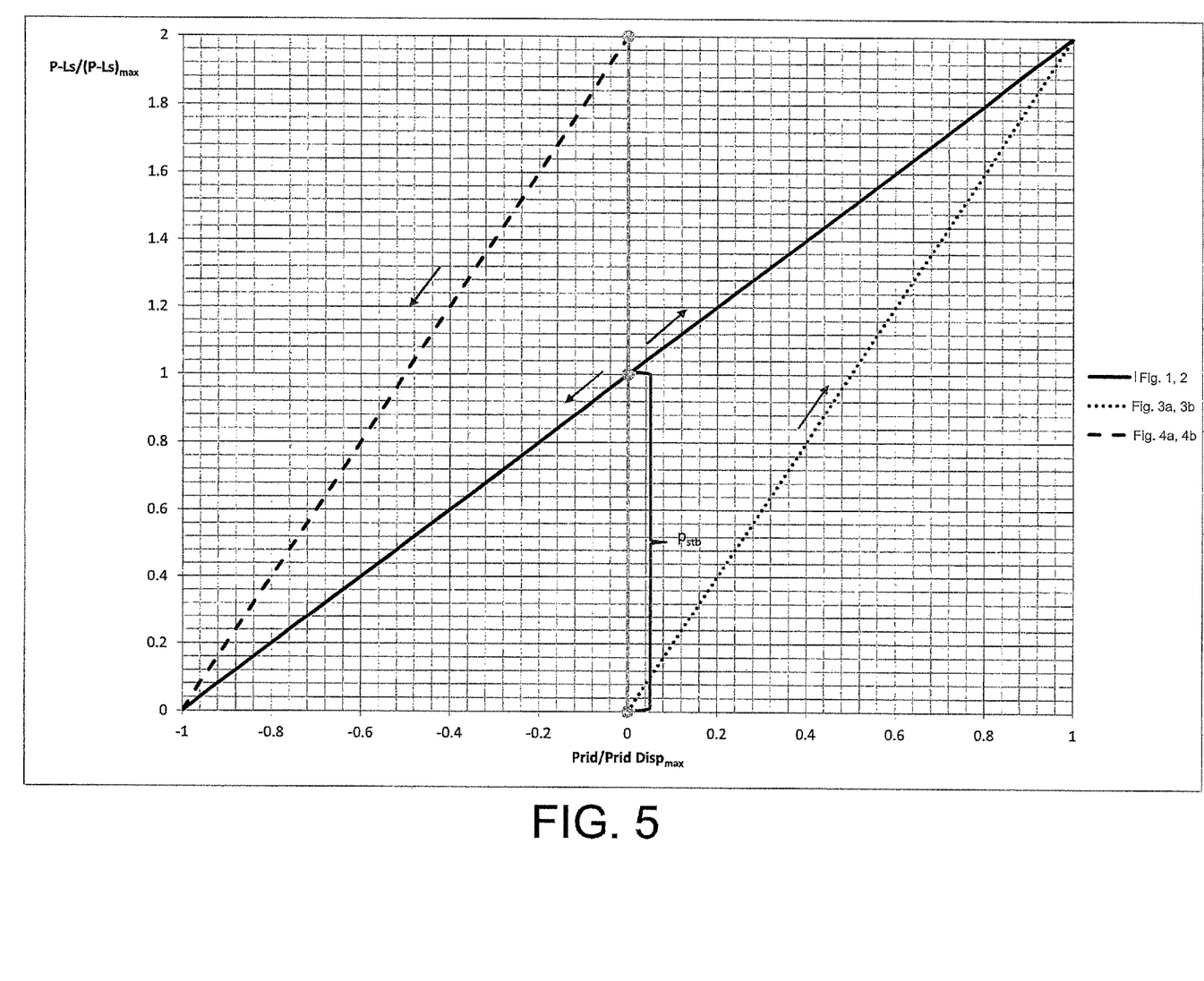
FIG. 5: shows a graph that summarizes the difference between two pressure signals as a function of the pressures sent by the reducers of the invention according to FIGS. 1-2-3a-3b-4a-4b, respectively.

FIG. 5 summarizes the possible values of P−LS (that is, the actual standby) in dimensionless parameters that can be obtained in order to better explain but not limit the device object of the invention, sending to the pump (and consequently to its own flow regulator) a signal $LS_C$ different from the actual LS of the system. Considering the value of P−LS equal to $p_{stb}$ equal to 1 and considering to energize one reducer at a time, a positive sign is attributed to pr1 and a negative sign to pr2, it can be noted that by energizing the reducing valve 5 the pressure $LS_A$ imposed by the regulator 4 increases and consequently the actual standby P−LS of the system increases and is in fact greater than the $p_{stb}$ value imposed by the pump regulator. On the other hand, by energizing the reducing valve 6 the pressure $LS_C$ regulated through the regulator 4 decreases by means of the pr2 and therefore the actual standby decreases. Summing up, by acting on the electric control of the proportional reducers, the invention allows varying the standby through the dosing niches of the sliders as a function of the most varied logics of which some examples have been previously stated.

It will in any case be appreciated that the standby variation can be obtained more generally by providing that the proportional valve 4 is subjected at a first end to the Load Sensing LS pressure coming from the channel 30 and at a second end to the $LS_C$ conditioned pressure LS to be provided to the supply apparatus 1 coming from the channel 31.

In addition, in order to obtain the aforesaid adjustment, the proportional valve 4 is further subjected at the first end and/or the second end to said reduced pressure pr1, pr2 provided by said proportional pressure reducing valve 5, 6.

According to a further aspect of the invention, in the cases in which the proportional valve 4, defining a pressure regular, is subjected only at one of the two ends to the reduced pressure, the opposite end is subjected to the action of one or more preloading springs, or, at a respective thrust area, to the pressure $p_T$ of the discharge channel, as illustrated in the further embodiments illustrated below.

Figure 3A:
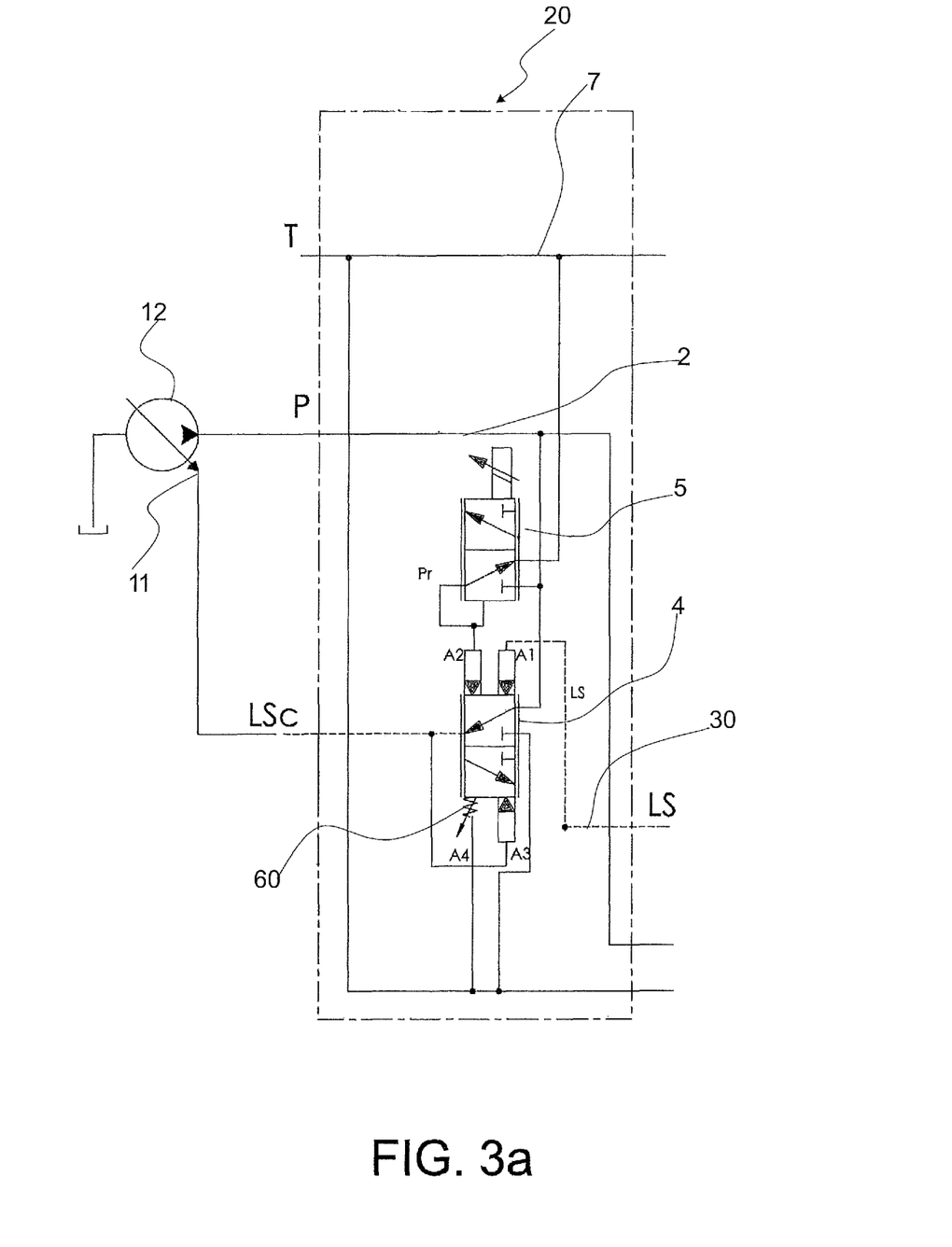
FIG. 3a shows a diagram of the hydraulic regulating device according to an alternative embodiment.

In the embodiment of FIG. 3a, in the hydraulic regulating device 20 the reducing valve 6 and the pressure signal pr2 acting on the proportional valve 4 on the area A4 are replaced by one or more springs 60 with equivalent pressure pm2. It can therefore be observed that in this variant the reducing valve 5 and the relative reduced pressure signal is integral with the thrust direction of the signal LS and in opposition to the preloading spring 60.

In other words, in the diagram of FIG. 3a the spring 60 has been replaced by the reducer 6, therefore:

$$P-LS=pr1-pm2+p_{stb}$$

Where pm2 is the equivalent pressure exerted by the spring 60 on the valve box 4. Consequently (as shown in FIG. 5) when the reducer 5 is de-energized the actual difference P−LS is lower than the $p_{stb}$ value and close to the minimum value which the actual standby of the system can assume. As the pr1 increases, the actual standby increases allowing with equal slider stroke for an adjustment with a greater flow rate delivered to the uses.

Figure 3B:
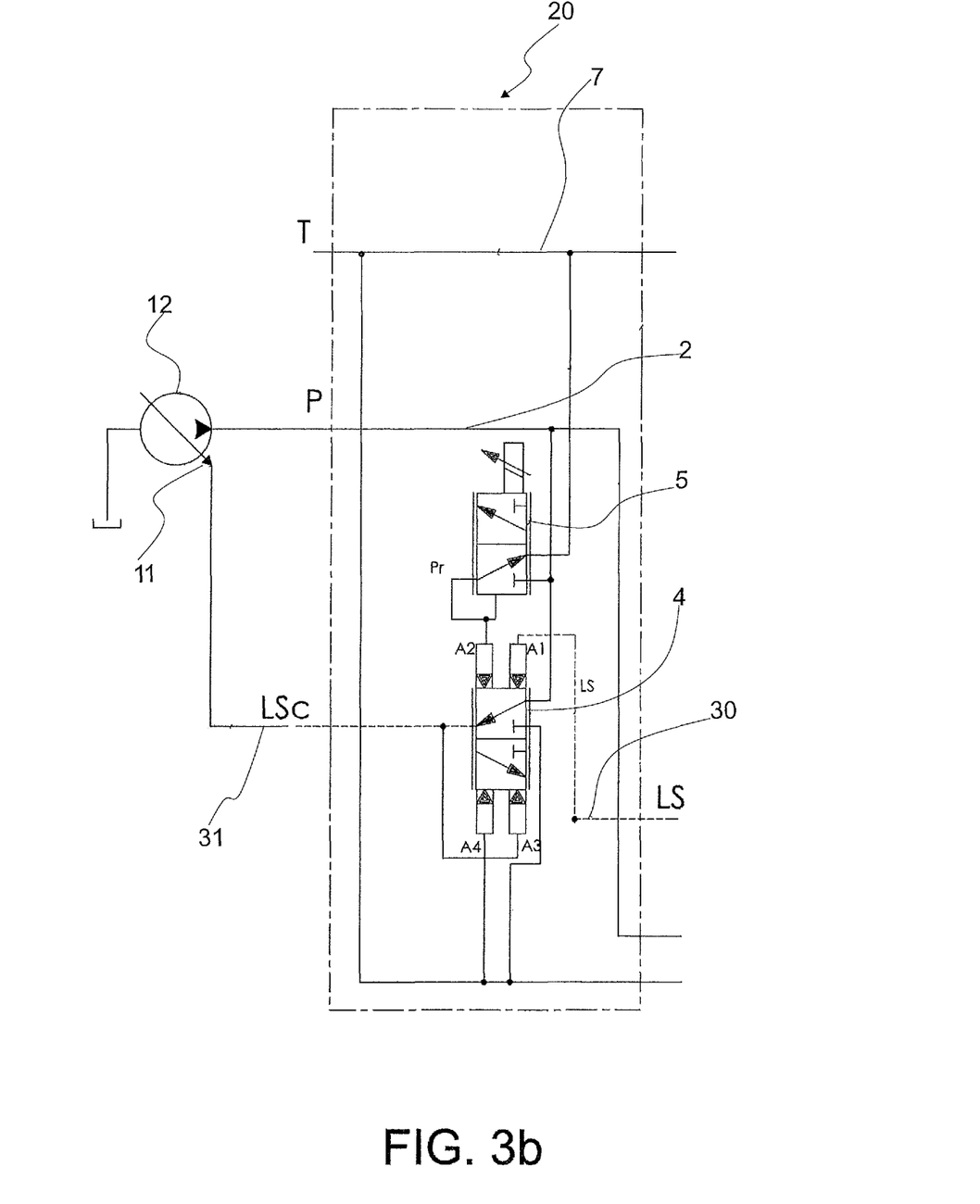
FIG. 3b: shows the diagram of the hydraulic regulating device of FIG. 3a according to a variant embodiment.

In the variant embodiment of FIG. 3b the spring 60 is replaced by the pressure signal coming from the discharge, therefore:

$$P-LS=pr1-T+p_{stb}$$

The effects that can be obtained on $LS_C$ are the same as those of the solution of FIG. 3a with obviously a range of variation on the equivalent pressure value acting on the more limited area A4.

Figure 4A:
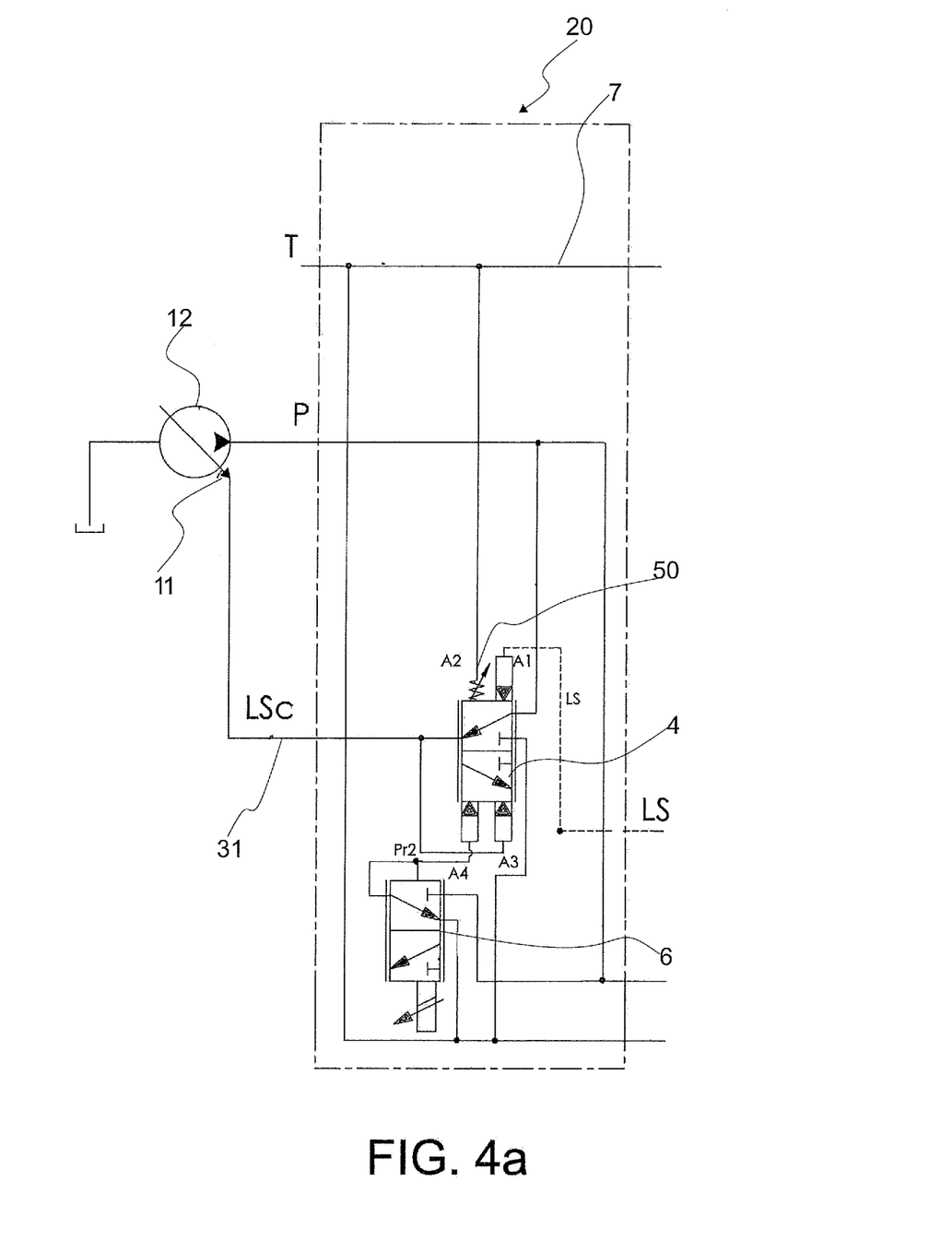
FIG. 4a shows a diagram of the hydraulic regulating device according to another embodiment.

In contrast, in the variant embodiment of FIG. 4a, the spring 50 replaces the reducer 5 and, in this case:

$$P-LS=pm1-pr2+p_{stb}$$

Where pm1 is the equivalent pressure exerted by the spring 50 on the box 4. With de-energized reducer, the actual standby is brought to a maximum value resulting from the sum of the effects of the spring of the pump regulator $p_{stb}$ and the spring pm1 at the end of the regulator 4. As can be seen in FIG. 5, by energizing the reducer 6, consequently by applying the signal pr2 to the box, the actual standby decreases.

It can therefore be observed that in this variant the reducing valve 6 and the relative reduced pressure signal is in opposition with the thrust direction of the signal LS and the action of the preloading spring 50.

Figure 4B:
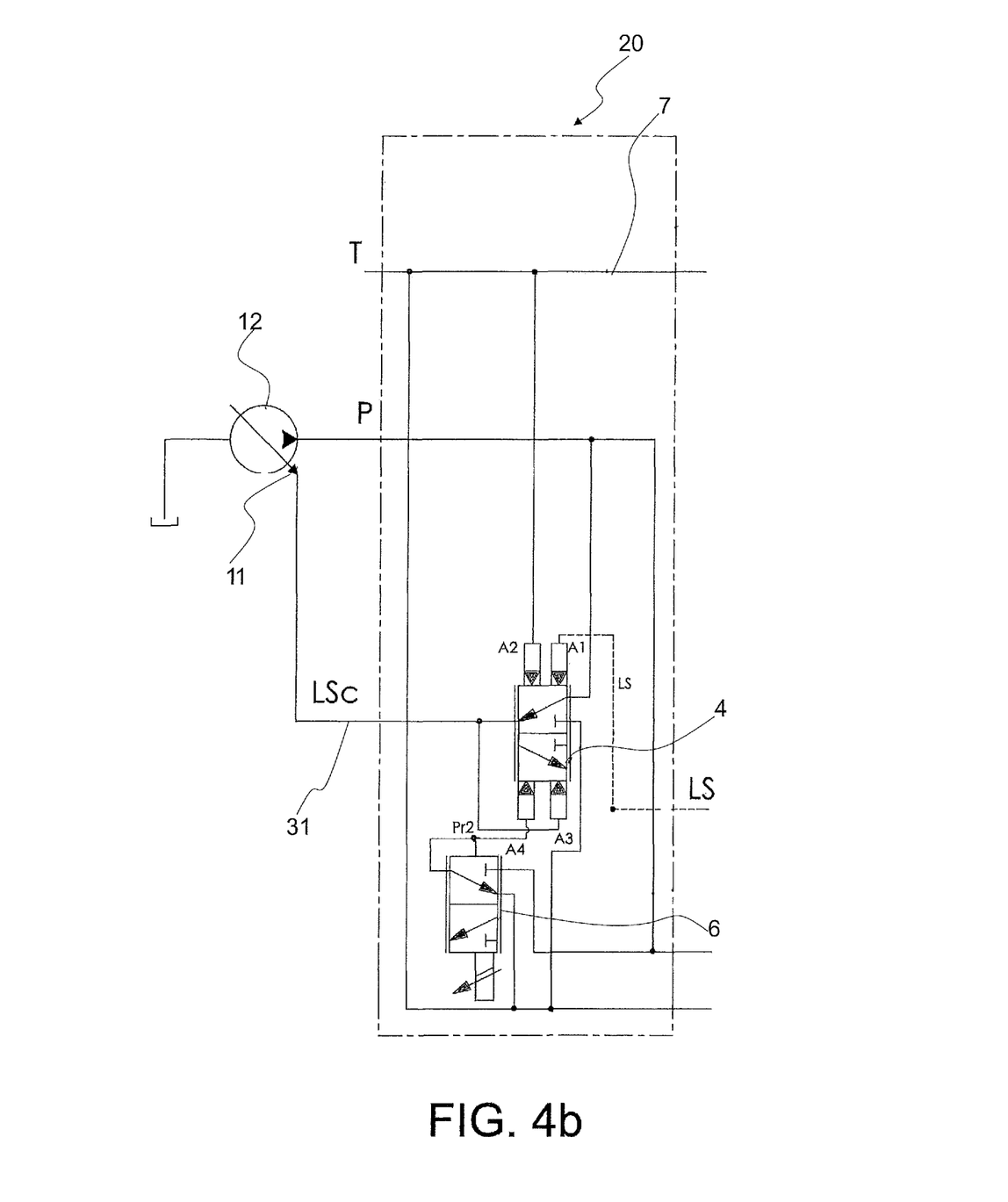
FIG. 4b: shows the diagram of the hydraulic regulating device of FIG. 4a according to a variant embodiment.

A conceptually analogous solution is also described in the variant embodiment of FIG. 4b, replacing the pressure signal of the spring 50 coming from the discharge, therefore:

$$P=LS=T-pr2+p_{stb}$$

Figure 6:
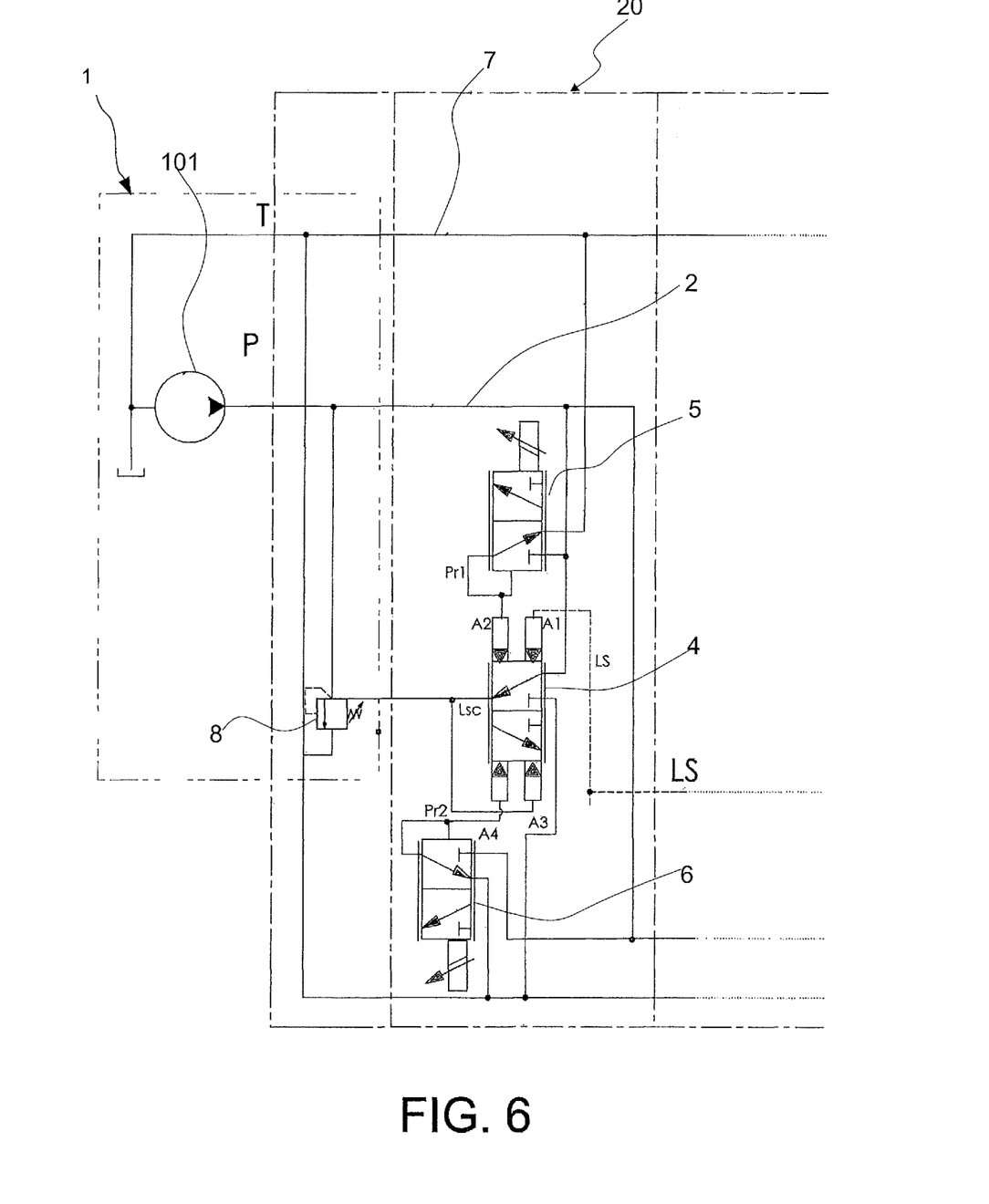
FIG. 6: shows a diagram of the hydraulic regulating device of the present invention according to a further variant embodiment.

Finally, FIG. 6 shows another embodiment in which the same hydraulic regulating device 20 object of the invention is inserted but in this case the hydraulic system 100 is supplied by a supply assembly 1 which comprises a fixed or variable displacement pump 101 but not LS. In derivation from the supply line 2 there is 2-position 2-way box 8 that connects the high pressure P channel 2 with the discharge channel 7, at the ends of which the pressure P is applied and in opposition to the pressure LS and to a spring 91 which imposes an equivalent pressure $p_{stb91}$. The valve regulator device can be made in accordance with the invention, for example according to any of the embodiments illustrated above.

In this case the regulator 8 discharges the excess flow rate not required, but the flow rate delivered by the pump 101 is not cut, therefore even if no slider connected to one of the uses is actuated, the pump sends all the flow rate that is drained in the discharge at the pressure $p_{stb91}$.

The lower $p_{stb91}$ is, the higher the energy savings of the system but at low $p_{stb91}$ high flow rates cannot be reached for uses. The solution of FIG. 6 allows adopting a spring 91 which imposes a low $p_{stb91}$ so as to have energy saving when the slider is not actuated, and then increase the $p_{stb91}$ value when the slider itself is actuated and thus obtain the required flow rates.

The invention therefore solves the proposed problem, at the same time achieving a plurality of advantages, including the possibility of varying the actual standby as a function of the operative features of the system.

In addition, the invention also allows achieving the advantages typically found in an LS Flow sharing hydraulic system with a LS variable displacement pump, which can be summarized as follows:

Flow rate of the use dependent only of the stroke of the slider with set the standby (i.e. the difference between delivery pressure P and the pressure on the use LS). In this way the flow rate is independent of the load itself and function only of box stroke: Q~A(x)

When the request for flow rate, by the various actuated utilities, exceeds the maximum flow rate of the pump (saturation) the reduction in flow rates to the various utilities is proportionally distributed among the same utilities.

Generally the standby is imposed on the pump by a spring which, once calibrated, imposes a particular fixed value of constant standby pstb. With the introduction of the hydraulic regulating device object of the invention in its variants, the possibility of modifying the resulting standby value on the system in a proportional way is introduced, taking into consideration inputs coming from the rest of the machine. It is thus possible to introduce a further adjustment parameter into the flow rate law, that is Δp as a function of the LS modified pressure LSC.

The invention claimed is:
1. A hydraulic system comprising:
a distributing valve comprising one or more sections connectable to respective uses;
a supply apparatus comprising a pump and a supply channel connected to said pump, said supply apparatus being suitable to provide a flow rate of high-pressure operative fluid to said distributing valve;
a discharge channel connected or connectable to a low-pressure tank and to discharges of the uses connected to said distributing valve;

a use signal channel coming from the one or more sections of said distributing valve and receiving, from said one or more sections, a signal that is characteristic of the corresponding use, corresponding to a respective load sensing pressure that is characteristic of the operative condition of the corresponding use;

a hydraulic regulating device connected or connectable to said distributing valve and/or to said supply apparatus via said supply channel, said discharge channel and said use signal channel and including:

a 2-position 3-way proportional valve supplied by the supply channel, which is connected to said discharge channel and configured to provide operative fluid at a conditioned pressure, which is different with respect to said respective load sensing pressure that is characteristic of the use operative condition, to said supply apparatus, at least one proportional pressure reducing valve suitable to provide a reduced pressure to said proportional valve;

the proportional valve being subjected at a first end to said respective load sensing pressure that is characteristic of the operative condition of the use coming from said use signal channel and at a second end to the conditioned pressure to be provided to the supply apparatus;

the proportional valve being further subjected at the first end to said reduced pressure provided by said at least one proportional pressure reducing valve;

wherein said conditioned pressure is provided to a pressure compensator of said supply apparatus;

wherein said proportional valve comprises at said first end two distinct thrust areas, wherein said proportional valve is subjected on a first thrust area to the reduced pressure provided by a first proportional pressure reducing valve of the at least one proportional pressure reducing valve and on a second thrust area to said respective load sensing pressure that is characteristic of the operative condition of the use coming from said use signal channel.

2. The hydraulic system according to claim 1, wherein said proportional valve is subjected to said reduced pressure provided by said at least one proportional pressure reducing valve only at the first end, wherein the second end is subjected to an action of a spring urging the proportional valve with a respective equivalent pressure or subjected to a discharge pressure of the discharge channel connected to the tank.

3. The hydraulic system according to claim 1, wherein the at least one proportional pressure reducing valve includes a second proportional pressure reducing valve, wherein said proportional valve is subjected at said second end to the reduced pressure provided by the second proportional pressure reducing valve and to the conditioned pressure to be provided to the supply apparatus.

4. The hydraulic system according to claim 1, wherein the pump is a load sensing variable displacement pump, which includes a flow rate regulator comprising said pressure compensator to which said conditioned pressure is provided, wherein high-pressure provided by the supply channel is applied at an end of said pressure compensator, said high-pressure being opposed to the conditioned pressure and to a further spring providing a compensator equivalent pressure.

5. The hydraulic system according to claim 1, wherein the pump is a fixed or non-load sensing variable displacement pump and defines said pressure compensator which comprises a proportional 2-position 2-way box that connects the supply channel to the discharge channel, at the ends of which the pressure provided by the supply channel is applied and in opposition to the conditioned pressure and a further spring, which imposes a compensator equivalent pressure.

6. The hydraulic system according to claim 1, wherein said hydraulic regulating device is formed as a distinct assembly that is independent with respect to the distributing valve, connected thereto via said supply channel, said discharge channel, and said use signal channel.

7. The hydraulic system according to claim 1, and further comprising a control unit operatively connected to the at least one proportional pressure reducing valve to regulate said conditioned pressure to be provided to the supply apparatus via a change in the respective reduced pressure.

8. The hydraulic system according to claim 1, wherein said respective load sensing pressure that is characteristic of the operative condition of the use of said use signal channel is a load sensing pressure of said distributing valve.

9. The hydraulic system according to claim 3, wherein said proportional valve is subjected at said second end to the reduced pressure provided by the second proportional pressure reducing valve and to the conditioned pressure to be provided to the supply apparatus on two distinct thrust areas.

10. A hydraulic system comprising:

a distributing valve comprising one or more sections connectable to respective uses;

a supply apparatus comprising a pump and a supply channel connected to said pump, said supply apparatus being suitable to provide a flow rate of high-pressure operative fluid to said distributing valve;

a discharge channel connected or connectable to a low-pressure tank and to discharges of the uses connected to said distributing valve;

a use signal channel coming from the one or more sections of said distributing valve and receiving, from said one or more sections, a signal that is characteristic of the corresponding use, corresponding to a respective load sensing pressure that is characteristic of the operative condition of the corresponding use;

a hydraulic regulating device connected or connectable to said distributing valve and/or to said supply apparatus via said supply channel, said discharge channel and said use signal channel and including:

a 2-position 3-way proportional valve supplied by the supply channel, which is connected to said discharge channel and configured to provide operative fluid at a conditioned pressure, which is different with respect to said respective load sensing pressure that is characteristic of the use operative condition, to said supply apparatus, a first proportional pressure reducing valve and a second proportional pressure reducing valve suitable to provide respective first and second reduced pressure to said proportional valve;

the proportional valve being subjected at a first end to said respective load sensing pressure that is characteristic of the operative condition of the use coming from said use signal channel and at a second end to the conditioned pressure to be provided to the supply apparatus;

the proportional valve being further subjected at the first end and/or at the second end to said first reduced pressure provided by said first proportional pressure reducing valve;

wherein said conditioned pressure is provided to a pressure compensator of said supply apparatus, and wherein said proportional valve is subjected to said first reduced pressure provided by said first proportional pressure reducing valve only at one of the first end or the second end, wherein the other of the first end and the second end is subjected to the action of a spring urging the proportional valve with a respective equivalent pressure or subjected to a discharge pressure of the discharge channel connected to the tank, said proportional valve being subjected at the other of the first end or the second end to the second reduced pressure provided by said second proportional pressure reducing valve and to the conditioned pressure to be provided to the supply apparatus.

11. The hydraulic system according to claim 10, wherein said proportional valve is subjected at the other of the first end or the second end to the second reduced pressure provided by the second proportional pressure reducing valve and to the conditioned pressure to be provided to the supply apparatus on two distinct thrust areas.

12. A hydraulic system comprising:
a distributing valve comprising one or more sections connectable to respective uses;
a supply apparatus comprising a pump and a supply channel connected to said pump, said supply apparatus being suitable to provide a flow rate of high-pressure operative fluid to said distributing valve;
a discharge channel connected or connectable to a low-pressure tank and to discharges of the uses connected to said distributing valve;
a use signal channel coming from the one or more sections of said distributing valve and receiving, from said one or more sections, a signal that is characteristic of the corresponding use, corresponding to a respective load sensing pressure that is characteristic of the operative condition of the corresponding use;
a hydraulic regulating device connected or connectable to said distributing valve and/or to said supply apparatus via said supply channel, said discharge channel and said use signal channel and including:
a 2-position 3-way proportional valve supplied by the supply channel, which is connected to said discharge channel and configured to provide operative fluid at a conditioned pressure, which is different with respect to said respective load sensing pressure that is characteristic of the use operative condition, to said supply apparatus,
at least one proportional pressure reducing valve suitable to provide a reduced pressure to said proportional valve;
the proportional valve being subjected at a first end to said respective load sensing pressure that is characteristic of the operative condition of the use coming from said use signal channel and at a second end to the conditioned pressure to be provided to the supply apparatus;
the proportional valve being further subjected at the first end to said reduced pressure provided by said at least one proportional pressure reducing valve;
wherein said conditioned pressure is provided to a pressure compensator of said supply apparatus;
wherein the pump is a fixed or non-load sensing variable displacement pump and defines said pressure compensator which comprises a proportional 2-position 2-way box that connects the supply channel to the discharge channel, at the ends of which the pressure provided by the supply channel is applied and in opposition to the conditioned pressure and a further spring, which imposes a compensator equivalent pressure.

13. The hydraulic system according to claim 12, wherein said hydraulic regulating device is formed as a distinct assembly that is independent with respect to the distributing valve, connected thereto via said supply channel, said discharge channel, and said use signal channel.

14. The hydraulic system according to claim 12, and further comprising a control unit operatively connected to the at least one proportional pressure reducing valve to regulate said conditioned pressure to be provided to the supply apparatus via a change in the respective reduced pressure.

15. The hydraulic system according to claim 12, wherein said respective load sensing pressure that is characteristic of the operative condition of the use of said use signal channel is a load sensing pressure of said distributing valve.

* * * * *